United States Patent Office 3,575,851
Patented Apr. 20, 1971

3,575,851
PROCESS FOR SEPARATING ASH-FORMING COMPONENTS FROM SOOT
Pieter Visser, Amsterdam, and Godfried J. van den Berg, The Hague, Netherlands, assignors to Shell Oil Company, New York, N.Y.
Filed Dec. 12, 1969, Ser. No. 884,398
Claims priority, application Netherlands, Dec. 24, 1968, 6818689
Int. Cl. B01d 11/02
U.S. Cl. 210—22      8 Claims

ABSTRACT OF THE DISCLOSURE

There is disclosed a process for the separation of ash-forming components from soot originating from a process for the gasification of a feed containing hydrocarbons or free carbon. An aqueous suspension of the soot is contacted with oxygen and then passed into contact with at least one auxiliary substance capable of taking up the soot particles in a zone where the liquid is kept moving in a turbulent manner. The contact with oxygen causes the auxiliary substance to reject ash-forming components to the aqueous phase.

BACKGROUND

Figure 1:
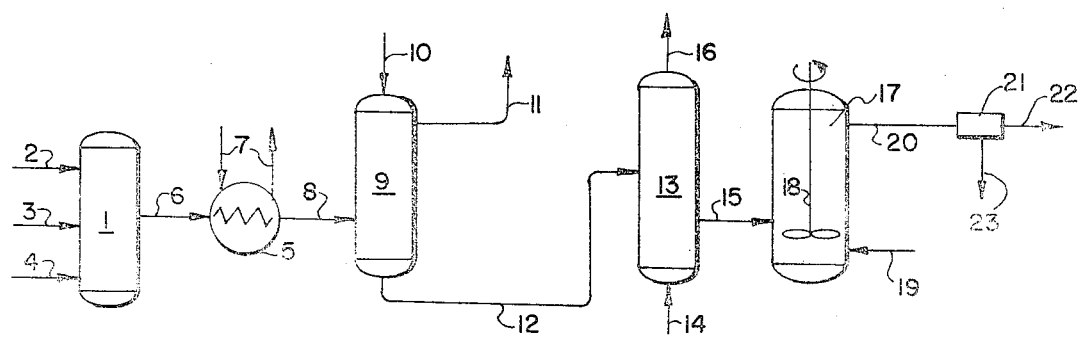

It is known that soot from an aqueous suspension may be taken up in a mineral oil or bitumen as auxiliary substance. The auxiliary substance expels the water from the surface of the soot particles. The process of the soot particles being taken up is usually initiated and promoted by the turbulent motion of the liquid. The particles while being taken up may remain attached one to another with formation of agglomerates, while the auxiliary substance acts as binding agent, or the particles may be taken up in the auxiliary substance to form a slurry, depending on the nature and the quantity of the auxiliary substance. As a rule, in the process of the particles being taken up, the auxiliary substance displays some selectivity so that some of the contaminants present in the soot are rejected by the auxiliary substance and remain the aqueous phase.

For convenience, soot particles taken up in at least one auxiliary substance will hereinafter be designated as agglomerates. However, for the process according to the invention it is not essential that the auxiliary substance should agglomerate the soot particles, and slurries are intended to be included in that term.

Besides a binding agent, a surface-active substance may be an important auxiliary substance in the agglomeration. An auxiliary substance of this type is capable of rendering the solid particles hydrophobic. It is also possible for the solid particles to be rendered oleophilic. In both cases the expulsion of the water by the binding agent is promoted and the selectivity with respect to contaminants may be improved.

The turbulent motion in the liquid may be brought about by a stirrer. A very suitable turbulent zone is formed by the annular space between two cylindrical surfaces, the inner cylindrical surface rotating about its axis. Here the turbulent zone may be considered to consist of a number of stages, by which short-circuiting between the inlet opening and the discharge opening is excluded and by which the agglomerates become to a greater extent similar in shape.

With several types of soot, particularly with soot originating from a gasification process using residual petroleum products as feed, it is found that by the known techniques outlined hereinbefore it is possible for contaminants to be largely excluded from the auxiliary substance by which the soot particles can be agglomerated. The contaminants here referred to are metal compounds which occur in many crude oils and petroleum fractions. In a combustion process non-volatile ash is formed from these compounds. In applications where the agglomerates are, for insatnce, added to the fuel in a gasification process, used as fuel/reducing agent in metallurgical processes or used as base material for the manufacture of active carbon it is preferred that little or no metal compounds should be present in the agglomerates. The invention provides an improved separation process.

THE INVENTION

The invention therefore relates to a process for the separation of ash-forming components from soot originating from a process for the gasification of a feed containing hydrocarbons or free carbon, from an aqueous suspension of the soot by passing the suspension and at least one auxiliary substance capable of taking up the soot particles through a zone where the liquid is kept moving in a turbulent manner, in which process the aqueous suspension is thoroughly contacted with an oxygen-containing gas before it is passed through the said zone. It is preferred that air is used as oxygen-containing gas.

It has been found from experiments that contacting the aqueous suspension with an oxygen-containing gas has a remarkable effect on the purity of the agglomerates. If a suspension of soot originating from a gasification process using a residual hydrocarbon as fuel is introduced, together with a gas oil as binding agent, into a stirred vessel, then approximately 10% of the quantity of metals supplied along with the suspension is discharged from the stirred vessel along with the water. If, however, the suspension of soot is thoroughly contacted with air before it is passed to the stirred vessel in accordance with this invention, then approximately 70% of the quantity of metals supplied along with the suspension is discharged along with the water. Thus agglomerates are obtained with a metal content approximately one-third of that of agglomerates manufactured from the same base materials by a process that does not include the oxygenation step of this invention.

A possible explanation for this remarkable effect is that the metal compounds present in the soot, by the contact with air, are brought to a condition in which they are less readily wetted by the binding agent. Oxidation phenomena may be responsible for this. It may well be that other phenomena also play a role. However, little is known on this subject.

It is preferred that the contacting with an oxygen-containing gas takes place at a temperature in the range from 20 to 120° C. Temperatures in the range from 80 to 100° C. are particularly suitable to avoid operation at superatmospheric pressure. The aqueous suspension may be in contact with the oxygen-containing gas for 1–10 minutes. For this purpose at least 1 m.$^3$ (S.T.P.) oxygen-containing gas is contacted with 1 m.$^3$ suspension. A larger quantity of gas is used when the time of contact is shorter and where the temperature is lower.

The contacting with oxygen-containing gas preferably takes place by bubbling the gas through the aqueous suspension, preferably by countercurrent contact in a continuous process. A narrow, high vessel promotes the duration of the residence time of the gas in the liquid. The aqueous suspension of soot originating from a gasification process contains soot in a concentration of a few percent. The metal concentration in a suspension is, for instance, 300 p.p.m. The quantity of oxygen required to obtain the intended effect of a better separation of ash-forming components from the soot is very small. The said minimum quantity of gas—1 m.$^3$ S.T.P. per m.$^3$ suspension—is not therefore determined by the oxygen consumption but, rather, by the desired contact time and the area of the surface of contact between gas and liquid. Also, the said minimum quantity makes it possible to attain a desired intensity of the motion of the suspension in the vessel, which tends to prevent sedimentation of the soot particles. It has been found favorable for the gas to be introduced at a linear velocity of 1–10 cm./s. It is also possible to use a column provided with trays suitable for contacting liquids and gases. Suitable trays are sieve trays or grid trays.

Passing an oxygen-containing gas through the suspension also promotes the removal of gases dissolved in the suspension. For instance, the suspension may contain dissolved HCN, which is an undesirable contaminant in the water stream after the agglomeration process. The removal of a dissolved gas such as HCN will preferably be effected in a stripper, in which operation of an oxygen-containing gas may be employed.

It is also possible for the contacting with an oxygen-containing gas to take place by passing the suspension, together with the gas stream, through a line and to separate the suspension from the gas stream at the end of the line. For this purpose a cyclone may be used. In the line a two-phase flow will develop, which will result in the desired intensity of the contact between gas and suspension.

The invention will now be further elucidated with the aid of two figures, which show schematic representations of embodiments of the process according to the invention.

Figure 2:
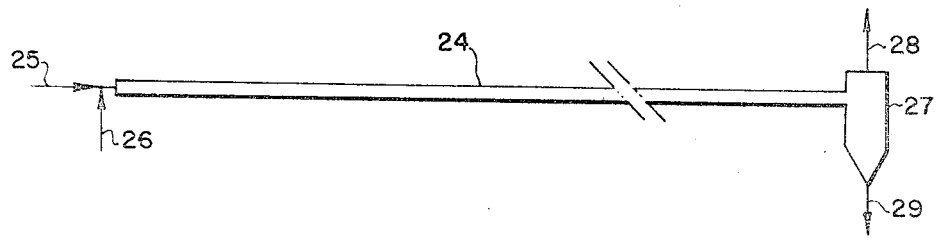

FIG. 1 is a schematic flow diagram illustrating the process of this invention and FIG. 2 is a schematic diagram illustrating one manner for effecting the process.

In FIG. 1 item 1 represents a reactor into which are introduced a feed containing hydrocarbons or free carbon, via inlet 2, and oxygen or an oxygen-containing gas, via inlet 3. Steam may be supplied via inlet 4. The dosages and the reaction conditions in reactor 1 are chosen so that the feed is converted as far as possible, by incomplete combustion, into a gas containing hydrogen and carbon monoxide. The gas leaving reactor 1 through line 6 also contains soot. In a heat exchanger 5 the gas stream is brought into indirect heat exchange with a water supplied through line 7. The cooled gas stream in line 8 is passed into a contacting apparatus 9 into direct contact with a water stream from line 10. This operation results in a gas stream in line 11 that has been freed from soot, and a stream of a suspension of soot in water in line 12.

The suspension in line 12 is passed to a vessel 13 into which a stream of oxygen-containing gas is introduced through line 14, for instance, a stream of air, which bubbles through the suspension in the vessel 13 in the upward direction. The air-treated suspension passes through line 15 while a gas stream is discharged from the the vessel at the upper side thereof through line 16. The suspension 15 is introduced into an agglomerating apparatus 17 which is provided with a stirring apparatus 18. A stream of auxiliary substance, for instance gas oil, is introduced into the apparatus 17 through line 19 at the underside thereof. From the apparatus 17 issues a stream through line 20 consisting of agglomerates of soot and gas oil, and of water. In a separating apparatus 21 for instance a sieve or a cyclone, the agglomerates are separated from the water, which results in a stream of agglomerates discharging via means 22 and a stream of water discharging through line 23. The water stream also contains the impurities, mainly metal compounds, which have come along with the gas stream 6 and which by the contact with air in the vessel 13 have been brought to a condition in which they are less readily wetted by the auxiliary substance.

The vessel 13 may be provided with trays, such as sieve trays or grid trays.

In FIG. 2 item 24 represents a long tube on one side of which there is introduced a stream of a suspension of soot in water, represented by line 25, and a stream of oxygen-containing gas represented by line 26, for instance a stream of air. In the tube 24 there is a multiphase system of the suspension containing gas bubbles. During the time of residence in the tube 24 the desired contact between the suspension and the oxygen-containing gas takes place. At the end of the tube a cyclone 27 causes separation of the gas from the liquid suspension, resulting in a gas stream passing through line 28 and a stream of suspension passing through line 29. When the suspension in line 29 is contacted with an auxiliary liquid, particles of soot will enter the auxiliary liquid while ash-forming ingredients will to a large extent remain in the water phase.

EXAMPLE I

A residual fuel containing vanadium in a concentration of 60 p.p.m. was gasified by incomplete combustion. The suspension of soot in water thus obtained contained 1.6 percent by weight of soot. When the suspension was processed in the conventional way to yield agglomerates and water, it was found that 90% of the vanadium in the original feed was contained in the agglomerates and only 10% of the vanadium was removed in the water.

A portion of the suspension of soot in water obtained was treated by bubbling air through it for 30 minutes at 40° C. The quantity of air amounted to 1 m.$^3$ (S.T.P.) to 1 m.$^3$ of suspension. The suspension thus treated was then processed to yield aggolmerates and water, and it was found that after the processing that only 30% of the vanadium introduced along with the feed was contained in the agglomerates and 70% of the vanadium was rejected with the water.

EXAMPLE II

A residual fuel containing vanadium in a concentration of 88 p.p.m. was gasified by incomplete combustion. The suspension of soot in water thus obtained contained 0.8 percent by weight of soot. This suspension was processed in the conventional way using the residual fuel as the auxiliary liquid to yield agglomerates and water. The agglomerates were entirely taken up in the fuel in the form of minute fragments. It was found that in that stage of the process where full equilibrium was attained the concentration of vanadium in the reactor feed had increased to 382 p.p.m. At equilibrium conditions the vanadium concentration in the agglomerates amounted to 1720 p.p.m. Consequently, a buildup factor of 4.3 was observed. Under conditions of complete recirculation of soot the buildup factor depends on the removal of vanadium by the water.

In an experiment with a residual fuel containing vanadium in a concentration of 70 p.p.m. the suspension of soot in water was treated with air before being processed to yield agglomerates and water. At a contact time of approximately 3 minutes 200 m.$^3$ (S.T.P.) air was applied to 9 m.$^3$ suspension at 90° C. The agglomerates obtained were likewise completely taken up in the fuel. It was found that in that stage of the process where full equilibrium was attained the concentration of vanadium in the reactor feed had increased to 180 p.p.m. In this case a vanadium-buildup factor of 2.6 was observed. The vanadium concentration in the agglomerates amounted to 960 p.p.m.

We claim as our invention:

1. A process for separating ash-forming components comprising vanadium from soot which comprises thoroughly contacting an aqueous suspension of said soot with an oxygen-containing gas, and subsequently contacting the oxygen-treated aqueous suspension with a mineral oil or bitumen capable of taking up the soot particles and rejecting water.

2. A process according to claim 1, in which process air is used as the oxygen-containing gas.

3. A process according to claim 1, in which contact with the oxygen-containing gas is effected at a temperature in the range from 20 to 120° C.

4. A process according to claim 3, in which contact is effected between 80 and 100° C.

5. A process according to claim 1, in which the aqueous suspension is in contact with the oxygen-containing gas from 1–10-minutes.

6. A process according to claim 1, in which at least 1 m.$^3$ (S.T.P.) oxygen-containing gas is contacted with 1 m.$^3$ suspension.

7. A process according to claim 1, in which the oxygen-containing gas is bubbled through the suspension.

8. A process according to claim 1, in which the contacting with an oxygen-containing gas takes place by passing the suspension together with oxygen-containing gas through a line and then separating the gas from the suspension.

References Cited

UNITED STATES PATENTS

| | | | |
|---|---|---|---|
| 2,725,985 | 12/1955 | Howard et al. | 210—53 |
| 2,728,714 | 12/1955 | Winkler et al. | 210—21X |
| 2,774,722 | 12/1956 | Buckland et al. | 210—21X |
| 2,867,540 | 1/1959 | Harris | 23—314X |
| 2,903,423 | 9/1959 | Mondria et al. | 210—21 |
| 3,349,029 | 10/1967 | Cheng | 210—21 |

REUBEN FRIEDMAN, Primary Examiner

T. G. WYSE, Assistant Examiner

U.S. Cl. X.R.

23—314